United States Statutory Invention Registration [19]

[11] Reg. Number: H749

Nagashima [43] Published: Mar. 6, 1990

[54] OIL SEAL

[75] Inventor: Akira Nagashima, Kawasaki, Japan

[73] Assignee: Kioritz Corporation, Mitaka, Japan

[21] Appl. No.: 268,658

[22] Filed: Nov. 8, 1988

Related U.S. Application Data

[63] Continuation of Ser. No. 81,027, Aug. 3, 1987, abandoned.

[30] Foreign Application Priority Data

Aug. 18, 1986 [JP] Japan ..... 61-125234

[51] Int. Cl.[4] ..... F16J 15/48

[52] U.S. Cl. ..... 277/50; 277/47; 277/152; 384/484

[58] Field of Search ..... 277/152, 153, 50, 47, 277/35, 237 A, DIG. 4, 37; 384/486, 484

[56] References Cited

U.S. PATENT DOCUMENTS

| | | | |
|---|---|---|---|
| 3,341,265 | 9/1967 | Paterson | 277/37 |
| 3,363,911 | 1/1968 | McKinven, Jr. | 277/153 X |
| 3,510,138 | 5/1970 | Bowen et al. | 277/235 R X |
| 3,531,168 | 9/1970 | Bainard | 384/486 |
| 3,692,318 | 9/1972 | Day et al. | 277/153 X |
| 3,741,615 | 6/1973 | Otto | 384/486 |
| 3,809,185 | 5/1974 | Kobayashi et al. | |
| 3,813,102 | 5/1974 | Derman | 384/484 |
| 4,114,898 | 9/1978 | Bainard et al. | 277/153 X |
| 4,699,526 | 10/1987 | Sato | 384/486 |

FOREIGN PATENT DOCUMENTS

| | | | |
|---|---|---|---|
| 916918 | 8/1954 | Fed. Rep. of Germany . | |
| 2008385 | 9/1971 | Fed. Rep. of Germany | 384/484 |

*Primary Examiner*—Thomas H. Tarcza
*Assistant Examiner*—Linda J. Wallace
*Attorney, Agent, or Firm*—Browdy and Neimark

[57] ABSTRACT

An oil seal disposed between a device having a rotary shaft and the rotary shaft. The oil seal comprises an annular supporting member supported within the fixed structure of the device and an annular elastic sealing member disposed in contact with the outer peripheral surface of the rotary shaft in such a manner as to allow relative sliding rotation therebetween. The annular supporting member has a peripheral supporting portion with a cup-shaped section taken along a plane including the axis of the rotary shaft, and the cup-shaped section opens to the outside of the device in the axial direction thereof. The annular elastic sealing member is fixed to an annular, radially-inwardly projecting portion of the annular supporting member.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

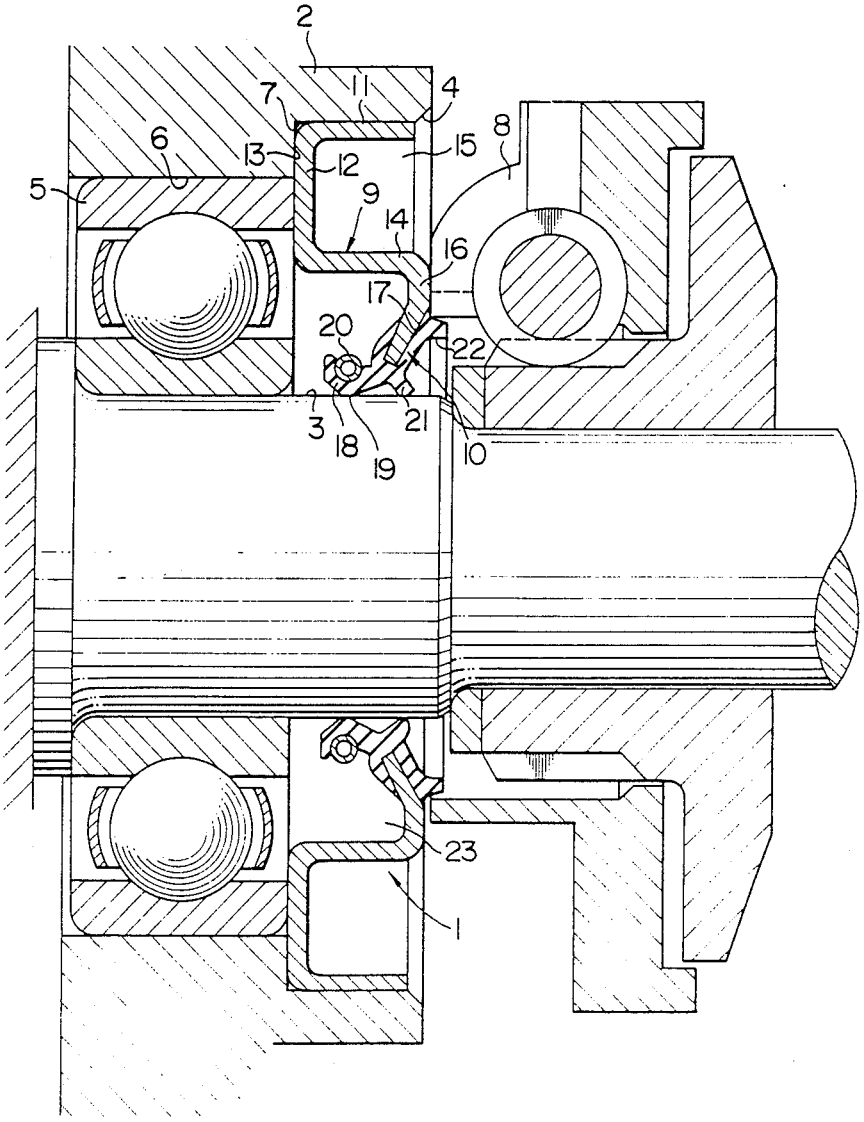
2
11
4
7
8
6
13
12
15
5
9
14
16
17
20
22
3
18
21
19
10
23
1

OIL SEAL

This application is a continuation of application Ser. No. 081,027, filed Aug. 3, 1987, now abandoned.

BACKGROUND OF THE INVENTION

1. Field of the Invention

The present invention relates to an oil seal, and more particularly to an oil seal which is suitable for sealing the gaps between a crankcase and a crankshaft of a crankcase pre-compression type two-cycle internal combustion engine.

2. Description of the Prior Art

An example of a conventional oil seal provided for an internal combustion engine of this type is so structured that it is integrally incorporated into a bearing which supports a crankshaft in such a manner as to allow the crankshaft's rotation relative to a crankcase. Since an oil seal with such a structure is manufactured on the basis of a special specification, its manufacture involves high production costs and a great deal of time. In addition, the bearing suffers from incomplete sealing of the radially inner and outer peripheral surfaces, and also from a relatively large weight as a bearing.

Another conventional oil seal of this kind is known. This oil seal has at a cup-shaped supporting member having at the radially outer edge a peripheral wall which is integral therewith and extends in the axial direction, and an annular elastic sealing member supported on the radially inner end of the supporting member, the tip of the axially extending peripheral wall of the peripheral supporting member being supported in such a manner as to face the axially inner direction of the device. Such an oil seal forms, on the crankcase side, a relatively large dead space communicating with the interior of the crankcase, which in turn causes an increase in the volume of the interior of the crankcase. Consequently, in the case of a crankcase pre-compression type two-cycle internal combustion engine, the primary compression ratio of the mixture within the crankcase drops, thus failing to provide the desired engine efficiency.

SUMMARY OF THE INVENTION

Accordingly, an object of the present invention is to eliminate the above-described defects of the prior art, and to provide an oil seal having a simple yet convenient configuration.

In order to achieve the above-stated object, the present invention provides an oil seal disposed between a device having a rotary shaft and the rotary shaft, the oil seal comprising: an annular supporting member supported within the fixed structure of the device and having a peripheral supporting portion with a cup-shaped section taken along a plane including the axis of the rotary shaft, the cup-shaped section opening to the outside of the device in the axial direction thereof; and an annular elastic sealing member disposed in contact with the outer peripheral surface of the rotary shaft in such a manner as to allow relative sliding rotation therebetween, the annular elastic sealing member being fixed to an annular projecting portion of the annular supporting member that projects therefrom radially inwardly.

By virtue of the arrangement of the oil seal in accordance with the present invention, the volume of the interior of the device in which the oil seal is disposed for providing a seal is reduced by an amount corresponding to the volume of the peripheral supporting portion with the U-shaped section of the annular supporting member. Thus, the oil seal of the present invention may be suitably used to provide a seal for, particularly, the crankshaft of a crankcase pre-compression type two-cycle internal combustion engine, while achieving a reduction in the dead space of the crankcase and, hence, an increase in the primary compression ratio of the mixture within the crankcase such as to improve the engine efficiency. In addition, it is possible to reduce the volume of the crank web by an amount corresponding to the reduction in the dead space of the crankcase, reduce the weight of the engine, and enable effective use of space which had been dead space in the prior art by making it open outwardly.

BRIEF DESCRIPTION OF THE DRAWINGS

The single drawing is a cutaway sectional view through essential parts of a crankcase pre-compression type internal combustion engine of a chain saw, to which an oil seal in accordance with an embodiment of the present invention is applied.

DESCRIPTION OF THE PREFERRED EMBODIMENT

The present invention will be described with respect to an embodiment thereof illustrated in the single drawing.

In the illustrated embodiment, the present invention is applied to, for example, a crankcase pre-compression type two-cycle internal combustion engine of a chain saw. An oil seal 1 in accordance with the present invention is provided for the purpose of sealing the gaps between a crankcase 2 and a crankshaft 3 of the two-cycle internal combustion engine. The crankcase 2 has a stepped opening 4 formed at one end thereof in such a manner as to open in the axial direction. The opening 4 in turn has a smaller-diameter opening portion 6 in which a rolling bearing 5 such as a ball bearing is disposed, and a larger-diameter opening portion 7 which is formed on the axially outer side of the smaller-diameter opening portion 6 in a concentrical manner, and in which the oil seal 1 is disposed. The crankshaft 3 is rotatably supported by the bearing 5 and extends from the opening 4 to the outside of the crankcase 2. A fixed part 8 including an oil pump device is disposed around the portion of the crankshaft 3 that extends from the crankcase 2 to the outside thereof in juxtaposition with the end of the crankcase 2 in which the opening 4 is formed.

The oil seal 1 has an annular supporting member 9 formed of a material such as metal, and an annular elastic sealing member 10 supported by the supporting member 9 and formed of an elastic material such as rubber.

The supporting member 9 has a peripheral supporting portion which has a thin-walled structure which in turn has a cup-shaped section taken along a plane including the axis of the crankshaft 3 and which opens to the outside of the crankcase 2 in the axial direction thereof. The peripheral supporting portion of the annular supporting member 9 consists of an radially outer peripheral wall 11 extending axially outwardly and fitted tightly on the inner peripheral surface of the larger-diameter opening portion 7 of the opening 4 of the crankcase 2, an axially inner wall 12 extending from the axially inner end of the radially outer peripheral wall 11 and disposed in contact with a shoulder portion 13 of the opening 4 and with an axially outer end surface of the bearing 5, and a radially inner wall 14 extending from the radially inner end of the axially inner wall 12 within the larger-diameter opening portion 7 in a concentrical manner with respect to the radially outer peripheral wall 11. Thus, the radially outer peripheral wall 11, the axially inner wall 12 and the radially inner wall 14 together define a U-shaped section having an annular space 15 which opens outwardly in the axial direction. The supporting member 9 further has a radially-inwardly projecting annular wall portion 16 which is integral therewith and projects radially inwardly from the axially outer end of the radially inner wall 14 to support the annular elastic sealing member 10 that is formed of an elastic material such as rubber.

This annular elastic sealing member 10 has an annular groove 17 formed therein and opening substantially radially outward when viewed from the perspective of a section therethrough taken in a plane including the axis of the crankshaft 3. The annular groove 17 is fitted around the radially-inwardly projecting wall portion 16 of the annular supporting member 9 and is secured thereto by, for instance, bonding, thereby fixing the sealing member 10 to the supporting member 9. The radially inner peripheral surface of a tip 18 of the sealing member 10 that extends axially inwardly constitutes a sealing portion 19 which is in contact with the outer peripheral surface of the crankshaft 3. A spring ring 20 is fitted on the radially outer surface of the tip 18 such as to press the tip 18 radially inward and thereby to bring it into close contact with the outer peripheral surface of the crankshaft 3, thus providing liquid-tight sealing between these members and enabling relative sliding rotation therebetween.

The sealing member 10 is also provided with an annular dust-prevention lip portion 21 formed at a location which is axially outward of the sealing portion 19. This lip portion 21 is in sliding engagement with the outer peripheral surface of the crankshaft 3 so as to prevent any dust from entering the interior of the crankcase 2 from the outside. The sealing member 10 is further provided with an annular projection 22 formed integrally therewith and extending substantially axially outward from the end portion of the sealing member 10 at which it is mounted on the supporting member 9. This projection 22 projects axially outwardly from the end surface of the crankcase 2, thereby providing a double seal which prevents penetration of any foreign matter through the gap between the crankcase 2 and the fixed part 8.

By virtue of this arrangement of the oil seal in accordance with the present invention, in the larger-diameter opening portion 7 of the opening 4 of the crankcase 2, the annular space 15, which acts as dead space located within the opening portion 7 closer to its radially outward periphery, is enclosed by the axially inner wall 12 and the radially inner wall 14 of the supporting member 9 which supports the oil seal 1, thus achieving a great deal of reduction in the volume of the remaining dead space portion 23 which communicates with the interior of the crankcase 2 through the bearing 5. In addition, the rise in pressure within the dead space portion 23 formed in the larger-diameter opening portion 7 which is caused by a primary compression of the mixture within the crankcase 2 acts on the sealing member 10 in such a direction that the sealing member 10 is pressed against the crankshaft 3, thereby ensuring that any leakage of liquid from the interior of the crankcase 2 is positively prevented. The illustrated embodiment is advantageous in that a surface of the axially inner wall 12 and a surface of the radially-inwardly projecting annular wall portion 16 can be used in determining the relative positions of the members concerned, and a large section modulus can be employed so as to reduce the thickness of the supporting member 9. However, the sealing member 10 may be mounted directly on the radially inner end of the axially inner wall 12, in which case the volume of the dead space 23 can be further decreased.

I claim:

1. An oil seal disposed in a device which includes a rotary shaft and a fixed structure thereabout, said oil seal comprising: an annular supporting member supported within the fixed structure of said device having a peripheral supporting portion with a cup-shaped section taken along a plane including the axis of said rotary shaft, said cup-shaped section opening to the outside of said device in the axial direction thereof, and said peripheral supporting portion having an axially outer whole surface of a fixed part of a roller bearing which rotatably support said rotary shaft; and an annular elastic sealing member disposed in contact with the outer peripheral surface of said rotary shaft in such a manner as to allow relative sliding rotation therebetween, said annular supporting member further having a radially inwardly projecting annular wall portion extending from said peripheral supporting portion and fixed to said elastic sealing member for supporting said sealing member.

2. An oil seal according to claim 1, wherein said annular elastic member has an annular dust prevention lip portion and an annular projection formed therein so as to provide a double seal which prevents penetration of any foreign matter through the outer peripheral surface of said rotary shaft.

* * * * *